United States Patent
Akagawa (10) Patent No.: US 10,363,611 B2
(45) Date of Patent: Jul. 30, 2019

(54) ROTATION TOOL HAVING FUNCTION OF FIXING WORKPIECE

(71) Applicant: FANUC CORPORATION, Yamanashi (JP)

(72) Inventor: Naoki Akagawa, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 104 days.

(21) Appl. No.: 15/377,151

(22) Filed: Dec. 13, 2016

(65) Prior Publication Data

US 2017/0165765 A1    Jun. 15, 2017

(30) Foreign Application Priority Data

Dec. 14, 2015 (JP) ................. 2015-243293

(51) Int. Cl.
| | |
|---|---|
| *B23B 41/00* | (2006.01) |
| *B23B 43/02* | (2006.01) |
| *B23B 3/24* | (2006.01) |
| *B23B 51/10* | (2006.01) |
| *B23Q 3/06* | (2006.01) |

(52) U.S. Cl.
CPC .............. *B23B 43/02* (2013.01); *B23B 3/24* (2013.01); *B23B 51/10* (2013.01); *B23Q 3/069* (2013.01); *B23B 2260/004* (2013.01); *B23B 2270/08* (2013.01); *B23B 2270/24* (2013.01); *Y10T 408/5584* (2015.01); *Y10T 408/5665* (2015.01)

(58) Field of Classification Search
CPC ..... B23B 51/10; B23B 2270/24; B23Q 3/069; Y10T 408/5584; Y10T 408/5665
See application file for complete search history.

(56) References Cited

U.S. PATENT DOCUMENTS 520,273 A * 5/1894 Schwickart ............. E01C 19/42
                                                          404/83
567,795 A * 9/1896 Roberts ................. B23B 51/107
                                                          408/82

(Continued)

FOREIGN PATENT DOCUMENTS

| CN | 203956547 U | 11/2014 |
|---|---|---|
| CN | 104439546 A | 3/2015 |

(Continued)

OTHER PUBLICATIONS

English Machine Translation for Japanese Publication No. JPS60194401 U, published Dec. 25, 1985, 5 pgs.

(Continued)

*Primary Examiner* — Sunil K Singh
*Assistant Examiner* — Paul M Janeski
(74) *Attorney, Agent, or Firm* — Fredrikson & Byron, P.A.

(57) ABSTRACT

A rotation tool is mounted to a spindle of a machine tool. The rotation tool comprises a cutter holding portion to which blade portion is fixed and a fixing device which fixes a workpiece. The blade portion is disposed at a tip end of the cutter holding portion. The fixing device includes a movement portion formed to be movable in the interior of the cutter holding portion and a pressing device which presses the movement portion to a side toward the workpiece. The fixing device includes a shaft portion rotatably supported relative to the movement portion and a pressing portion which presses the workpiece.

5 Claims, 6 Drawing Sheets

(56) References Cited

U.S. PATENT DOCUMENTS

| | | | | |
|---|---|---|---|---|
| 1,332,898 A | * | 3/1920 | Hossie | B23B 51/107 |
| | | | | 279/9.1 |
| 1,941,551 A | * | 1/1934 | Gjertsen | B23C 5/242 |
| | | | | 408/112 |
| 3,675,518 A | * | 7/1972 | Germain | B22D 41/16 |
| | | | | 82/171 |
| 4,295,763 A | * | 10/1981 | Cunniff | B23B 51/05 |
| | | | | 144/24 |
| 8,910,360 B1 | * | 12/2014 | Keetle | B23B 51/0054 |
| | | | | 29/402.08 |

FOREIGN PATENT DOCUMENTS

| | | |
|---|---|---|
| EP | 2123379 A1 | 11/2009 |
| JP | 5676306 A | 6/1981 |
| JP | 59102514 A | 6/1984 |
| JP | 60183101 U | 12/1985 |
| JP | 60194401 U | 12/1985 |
| JP | 62150001 U | 9/1987 |
| JP | 796403 A | 4/1995 |
| JP | 20086528 A | 1/2008 |

OTHER PUBLICATIONS

English Abstract and Machine Translation for Japanese Publication No. 2008-006528 A, published Jan. 17, 2008, 8 pgs.

Untranslated Decision to Grant a Patent mailed by Japan Patent Office (JPO) for Application No. JP 2015-243293 dated Jan. 23, 2018, 3 pages.

English machine translation of Decision to Grant a Patent mailed by Japan Patent Office (JPO) for Application No. JP 2015-243293 dated Jan. 23, 2018, 3 pages.

Untranslated Notification of Reasons for Refusal mailed by Japan Patent Office (JPO) for Application No. JP 2015-243293 dated Nov. 21, 2017, 4 pages.

Translated Notification of Reasons for Refusal mailed by Japan Patent Office (JPO) for Application No. JP 2015-243293 dated Nov. 21, 2017, 3 pages.

English Abstract and Machine Translation for Japanese Publication No. 07-096403 A, published Apr. 11, 1995, 9 pgs.

English Translation and Notification of Reasons for Refusal submitted re Japanese Publication No. 62-150001 U (dated Nov. 13, 2017), published Sep. 22, 1987, 7 pgs.

English Machine Translation for Japanese Publication No. 60-183101 U, published Dec. 5, 1985, 4 pgs.

English Abstract and Machine Translation for Japanese Publication No. 59-102514 A, published Jun. 13, 1984, 5 pgs.

English Abstract and Machine Translation for Japanese Publication No. 56-076306 A, published Jun. 23, 1981, 4 pgs.

English Abstract and Machine Translation for Chinese Publication No. 203956547 U, published Nov. 26, 2014, 6 pgs.

English Abstract and Machine Translation for Chinese Publication No. 104439546 A, published Mar. 25, 2015, 5 pgs.

English Abstract and Machine Translation for European Publication No. 2123379 A1, published Nov. 25, 2009, 7 pgs.

* cited by examiner

ROTATION TOOL HAVING FUNCTION OF FIXING WORKPIECE

BACKGROUND OF THE INVENTION

1. Field of the Invention

The present invention relates to a rotation tool.

2. Description of the Related Art

Machining a surface of a workpiece using a machine tool has been known. With respect to a workpiece having a symmetric shape relative to a predetermined axis, lathe-turning process can be performed by a lathe. In lathe-turning process, the workpiece is fixed to a spindle of the lathe, and the workpiece is rotated by the spindle. A tool is pressed against the surface of the workpiece, whereby lathe-turning process of the surface of the workpiece can be machined.

In machining the surface of the workpiece, in addition to machining an outer circumferential surface of the workpiece, machining an inner surface and an end surface of the workpiece has been known. For example, in forming a recessed portion in the workpiece or forming a hole along an axis of the workpiece, cutting the inner surface of the workpiece has been known.

In Japanese Unexamined Patent Publication No. 2008-6528A, while rotating the workpiece using the lathe, machining an inner surface of a hole formed in the workpiece by a boring tool is disclosed. Further, lathe-turning process of the outer circumferential surface and end surface of the workpiece with a cutting tool provided with a throw-away tip is disclosed.

SUMMARY OF THE INVENTION

Machining the surface of the workpiece can be performed by, in addition to the lathe, a numerically controlled machine tool which can three-dimensionally change a relative position of the tool relative to the workpiece. In the numerically controlled machine tool, machining to cut the surface is performed.

In cutting process by the machine tool, the workpiece is fixed to a table. A fixing device which fixes the workpiece is disposed on the table. In machining a plurality of parts, such as the end surface and the inner surface of the workpiece, the tool may interfere with the fixing device during machining the workpiece. Accordingly, when machining a plurality of parts, disposing a plurality of fixing devices on the table is considered. Then, switching the fixing devices after finishing machining one part, and machining another part are considered.

However, a position and a posture of the workpiece on the table slightly change by switching the fixing devices so that machining accuracy may deteriorate. For example, when a surface to be machined is finished into a plane shape, the surface to be machined may be provided with a step. Thus, there has been a problem in that when cutting a plurality of parts of the workpiece is performed by the machine tool in which the tool moves relative to the table, obtaining high machining accuracy as by lathe-turning process using the lathe is difficult. In particular, there has been a problem in that machining with high machining accuracy is difficult when the inner surface and the end surface of the workpiece are cut.

Further, in an ordinary fixing device for workpiece, the workpiece is fixed from outside. For example, the fixing device sandwiches the outer circumferential surface of the workpiece in a radial direction, thereby fixing the workpiece. However, fixing the workpiece from outside may be difficult depending on an outer shape of the workpiece. For example, in the workpiece having an outer diameter changing along an axial direction, an outer surface is inclined along the axial direction. Consequently, there has been a problem in that fixing the workpiece by the fixing device which presses the workpiece in the radial direction is difficult.

The rotation tool of the present invention is a rotation tool mounted to a spindle of a machine tool through a tool holder. The rotation tool comprises a cutter holding portion which is fixed to the tool holder and to which a blade portion is fixed, and a fixing device which fixes a workpiece to a workpiece support member by pressing the workpiece. The blade portion is disposed at a tip end of the cutter holding portion on the side toward the workpiece. The fixing device includes a movement portion formed to be movable in the interior of the cutter holding portion and a pressing device which presses the movement portion to a side toward the workpiece. The fixing device includes a shaft portion rotatably supported relative to the movement portion and disposed coaxially with the spindle and a pressing portion which is disposed at a tip end of the shaft portion and presses the workpiece.

In the invention as described above, the blade portion can include an inner surface cutting portion which cuts an inner surface of the workpiece and an end surface cutting portion which cuts an end surface of the workpiece.

In the invention as described above, the pressing device can include a working fluid supply device which supplies a working fluid. The working fluid can include a compressed air or a hydraulic oil supplied through the tool holder. The movement portion can be pressed by a pressure of the working fluid. The working fluid supply device can control the pressure of the working fluid in such a manner as to press the movement portion at a predetermined constant pressure during machining of the workpiece.

In the invention as described above, the pressing device can include a working fluid supply device which supplies a working fluid. The working fluid can include a compressed air or a hydraulic oil supplied through the tool holder. The movement portion can be pressed by a pressure of the working fluid. The working fluid supply device can be formed in such a manner as to be capable of adjusting the pressure of the working fluid in accordance with a machining method or a type of the workpiece. In the invention as described above, the pressing device can include a spring member disposed between the movement portion and the cutter holding portion. The movement portion can be pressed by the spring member.

DETAILED DESCRIPTION

A rotation tool and a machine tool including the rotation tool according to an embodiment will be described with reference to FIG. 1 to FIG. 7. The rotation tool according to the present embodiment has a function of fixing a workpiece to a workpiece support member by pressing the workpiece.

Figure 1:
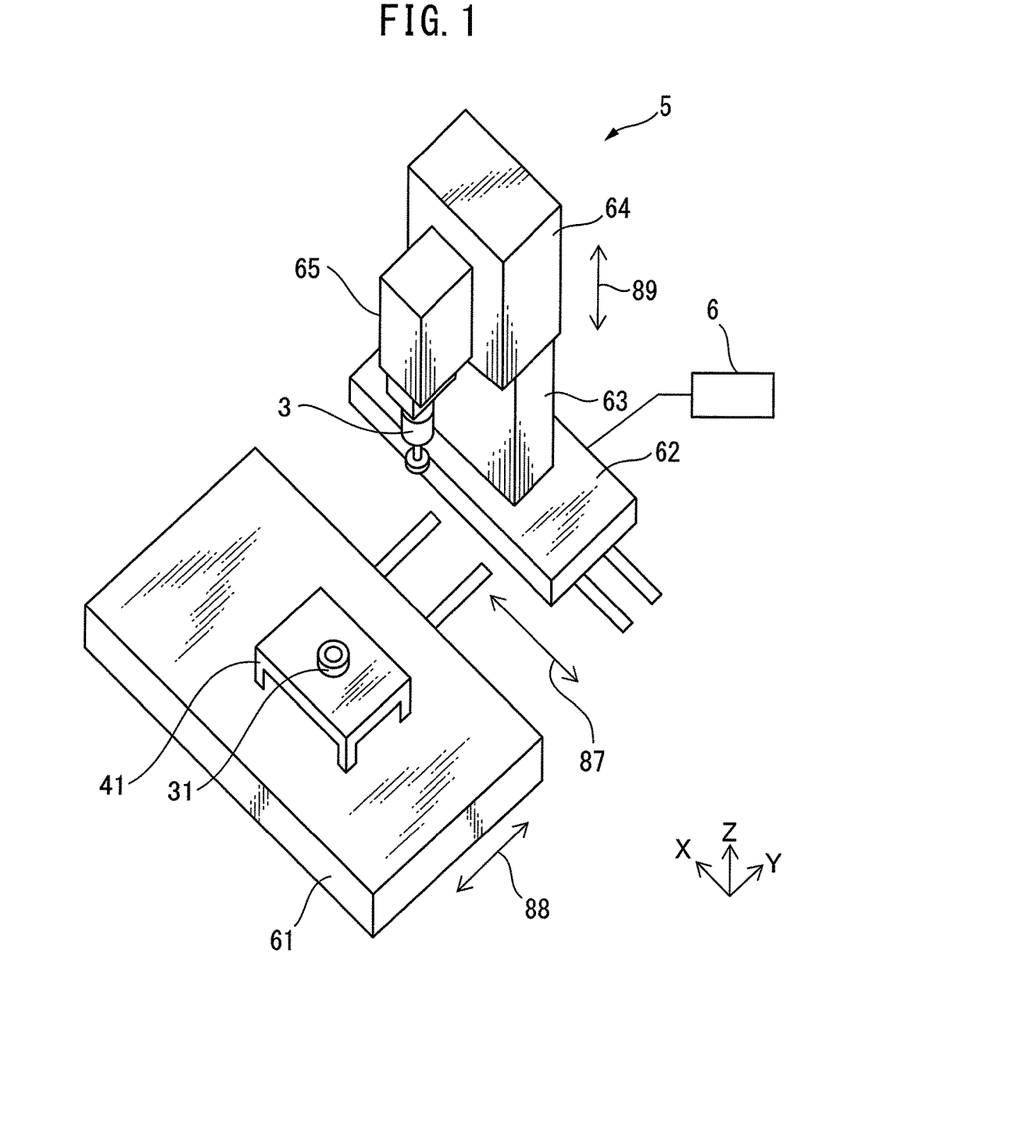
FIG. 1 is a schematic perspective view of a machine tool according to an embodiment.

FIG. 1 is a schematic perspective view of the machine tool according to the present embodiment. In the present embodiment, by way of example, a numerically controlled machine tool 5 having three drive axes will be described. The machine tool 5 includes a table 61 to which a workpiece 31 is fixed and a base 62 which supports a rotation tool 3. The machine tool 5 includes a support post 63 fixed to the base 62. The machine tool 5 includes a movable slide member 64 supported by the support post 63 and a spindle head 65 supported by the slide member 64. The rotation tool 3 is supported by the spindle head 65. A workpiece support member 41 which supports the workpiece 31 is fixed to the table 61.

The machine tool 5 includes a drive device which changes a relative position and a posture of the rotation tool 3 relative to the workpiece 31. The machine tool 5 includes a control apparatus 6 which controls the drive device. The control apparatus 6 includes a calculation processing device provided with a CPU (central processing unit), a RAM (random access memory), and a ROM (read only memory) which are connected to each other through a bus, and the like. Further, the control apparatus 6 includes a storage part which stores information on a control of the machine tool 5. The drive device according to the present embodiment moves the base 62 in X-axis direction indicated by an arrow 87. The drive device moves the table 61 in Y-axis direction indicated by an arrow 88.

The drive device moves the slide member 64 in Z-axis direction indicated by an arrow 89. The drive device according to the present embodiment controls the relative position of the rotation tool 3 relative to the workpiece 31 by the drive axes consisting of three linear axes (X-axis, Y-axis, and Z-axis). While the relative position of the rotation tool 3 relative to the workpiece 31 is changed by the drive device, the workpiece 31 can be machined. As the drive device, which is not limited to such a configuration, an arbitrary device capable of changing the relative position of the tool relative to the workpiece can be employed.

Figure 2:
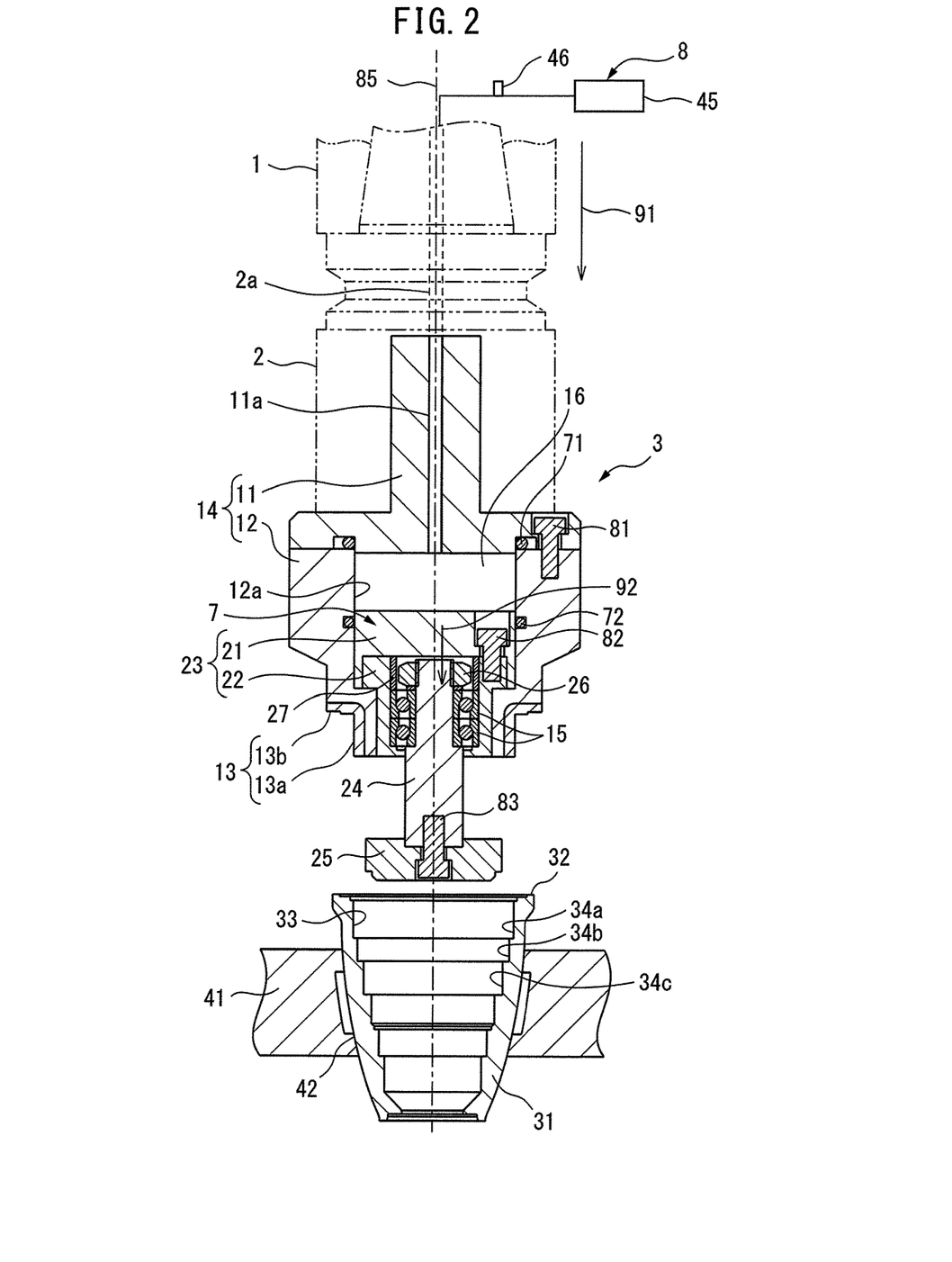
FIG. 2 is first enlarged cross-sectional view of a rotation tool and a workpiece according to the embodiment.

FIG. 2 shows first enlarged cross-sectional view of the rotation tool and the workpiece according to the present embodiment. The rotation tool 3 according to the present embodiment is fixed to a spindle 1 of the machine tool 5. The rotation tool 3 is mounted to the spindle 1 through a tool holder 2. The spindle 1 is formed in such a manner as to rotate about a rotation axis 85.

The rotation tool 3 comprises a cutter holding portion 14 fixed to the tool holder 2. The cutter holding portion 14 includes a holder shank 11 fixed to the tool holder 2. The holder shank 11 is fixed to the tool holder 2 by a fastening member, such as a screw. The cutter holding portion 14 includes a cutter holder 12 fixed to the holder shank 11. The cutter holder 12 is formed to have a hollow shape. The cutter holder 12 is fixed to the holder shank 11 by a screw 81. A sealing member 71 is disposed at a contact portion between the holder shank 11 and the cutter holder 12. The sealing member can be configured by an O-ring or the like. A blade portion 13 is fixed to a tip end portion of the cutter holder 12 on the side toward the workpiece 31. The plurality of blade portions 13 are disposed along a circumferential direction of a tip end portion of the cutter holding portion 14.

The workpiece 31 according to the present embodiment has a tubular shape. In the interior of the workpiece 31, first wall surface 34a, second wall surface 34b, and third wall surface 34c which have inner diameters different from each other are formed. In the present embodiment, cutting process is performed in the wall surface 34a closest to an end surface 32 among the wall surfaces 34a, 34b, and 34c as plural. Further, cutting process is performed in the end surface 32 of the workpiece 31. The machine tool 5 according to the present embodiment machines the wall surface 34a and the end surface 32 in a continuous manner in a single step.

The blade portion 13 includes an inner surface cutting portion 13a formed in such a manner as to extend parallel to the rotation axis 85. The inner surface cutting portion 13a cuts the first wall surface 34a of an inner surface 33 of the workpiece 31. Further, the blade portion 13 includes an end surface cutting portion 13b which cuts the end surface 32 of the workpiece 31. The end surface cutting portion 13b according to the present embodiment is formed in such a manner as to extend in a direction vertical to the rotation axis 85. The inner surface cutting portion 13a and the end surface cutting portion 13b are formed so as to correspond to a shape of a surface of the workpiece 31 which has been machined. For example, an outer diameter of the inner surface cutting portion 13a is formed in such a manner as to correspond to the inner diameter of the first wall surface 34a formed in the workpiece 31. Further, the end surface cutting portion 13b according to the present embodiment has a stepwise cross-sectional shape so that the end surface 32 is provided with a step.

The workpiece 31 is disposed at the workpiece support member 41 fixed to the table 61 of the machine tool 5. The workpiece support member 41 includes a hole 42 formed in such a manner as to match an outer shape of the workpiece 31. The workpiece 31 is disposed in the interior of the hole 42. Before the machine tool 5 drives, the workpiece 31 is merely disposed in the interior of the hole 42 and is in a state in which the workpiece 31 is not fixed to the workpiece support member 41.

The workpiece 31 according to the present embodiment has a shape in which an outer diameter gradually decreases along an axial direction in a cross-sectional shape. Fixing the workpiece 31 having such a shape by pressing an outer circumferential surface in a radial direction is difficult. For example, fixing the workpiece 31 by a chuck device having three claw portions such as provided to a lathe is difficult. The rotation tool 3 according to the present embodiment includes a fixing device 7 which fixes the workpiece 31 to the workpiece support member 41. The fixing device 7 fixes the workpiece 31 by pressing the same toward the workpiece support member 41.

The fixing device 7 includes a movement portion 23 formed to be movable in the interior of the cutter holding portion 14. In the cutter holder 12, a cylindrical hole 12a is formed. The movement portion 23 is disposed in the interior of the hole 12a.

The movement portion 23 is formed to be movable in a direction in which the rotation axis 85 extends. The movement portion 23 includes a piston member 21 which receives a pressure of a working fluid and a bearing holding member 22 fixed to the piston member 21. The bearing holding member 22 is fixed to the piston member 21 by a screw 82. The piston member 21 and the bearing holding member 22 according to the present embodiment are formed in such a manner as to have a cross-sectional shape which is circular when cutting by a plane vertical to the rotation axis 85.

The fixing device 7 includes a bearing 15 which rotatably supports a shaft portion 24. The bearing 15 is supported by the bearing holding member 22. The shaft portion 24 is formed to have a cylindrical shape. The shaft portion 24 is disposed coaxially with the rotation axis 85. The shaft portion 24 is supported by the movement portion 23 through the bearing 15. The shaft portion 24 is supported in such a manner as to be rotatable about the rotation axis 85. Thus, the shaft portion 24 is formed to be relatively rotatable with respect to the movement portion 23.

A nut 26 is fixed to one end portion of the shaft portion 24. Fastening the nut 26 allows an inner ring of the bearing 15 to be fixed to the shaft portion 24. Further, a cylindrical sleeve 27 is disposed at an outer side of the nut 26. Fastening the screw 82 allows the sleeve 27 to press against an outer ring of the bearing 15. Then, the outer ring of the bearing 15 is fixed to the movement portion 23.

The fixing device 7 includes a pressing portion 25 disposed at a tip end of the shaft portion 24. The pressing portion 25 is fixed to the shaft portion 24 by a screw 83. The pressing portion 25 comes into contact with the inner surface 33 of the workpiece 31. The pressing portion 25 can be formed in such a manner as to correspond to a shape of a portion of the workpiece 31 which comes into contact. The pressing portion 25 according to the present embodiment is formed in such a manner as to match a shape of a portion of the third wall surface 34*c*. Note that the shaft portion and the pressing portion may be formed of a single member.

When the spindle 1 rotates, the tool holder 2 and the cutter holding portion 14 integrally rotate. Further, the movement portion 23 rotates together with the spindle 1. In contrast, the shaft portion 24 can maintain a stop state even when the cutter holding portion 14 rotates.

The rotation tool 3 according to the present embodiment includes a pressing device 8 which presses the movement portion 23 toward the workpiece 31. The pressing device 8 of the rotation tool 3 presses the movement portion 23 by a pneumatic pressure. The rotation tool 3 includes an air room 16 enclosed by an inner surface of the cutter holder 12, a bottom surface of the holder shank 11, and a top surface of the piston member 21. A sealing member 72 is disposed at a contact portion between an outer circumferential surface of the piston member 21 and the hole 12*a* of the cutter holder 12. Thus, the air room 16 is sealed.

In the tool holder 2, an air supply hole 2*a* is formed along the rotation axis 85. Further, in the holder shank 11, an air supply hole 11*a* is formed along the rotation axis 85. The air supply hole 11*a* communicates with the air supply hole 2*a* and the air room 16. The pressing device 8 of the rotation tool 3 includes a working fluid supply device which supplies the working fluid. In the present embodiment, an air supply device 45 disposed at the machine tool 5 functions as the working fluid supply device. The air supply device 45 supplies a compressed air as pressurized. Further, a pressure sensor 46 which detects a pressure of the air is disposed at a flow passage through which the air is supplied. The pressure sensor 46 is connected to the control apparatus 6.

The compressed air is supplied through the spindle 1 to the air supply hole 2*a* of the tool holder 2. The compressed air is supplied from the air supply hole 2*a* to the air room 16 through the air supply hole 11*a* of the holder shank 11. The pressure of the compressed air supplied to the air room 16 allows the movement portion 23 to be pressed in a direction along the rotation axis 85 toward the workpiece 31 as indicated by an arrow 92.

Note that as the working fluid which presses the movement portion 23, which is not limited to the compressed air, an arbitrary working fluid can be used. For example, hydraulic oil can be used as the working fluid. The movement portion 23 can be pressed by a pressure of the hydraulic oil. When the hydraulic oil is used as the working fluid for example, an oil room can be provided in the interior of the tool holder. The hydraulic oil can be supplied from the oil room. Further, a mechanism which allows a volume of the oil room to be changed can be disposed. For example, a screw having a changeable length projecting into the interior of the oil room, or the like, can be disposed. Changing the length of the screw projecting into the interior of the oil room allows the volume of the oil room to be changed. As a result, the pressure of the hydraulic oil can be changed.

Next, cutting process using the rotation tool 3 according to the present embodiment will be described. First, the workpiece 31 is disposed at the workpiece support member 41. The workpiece 31 is disposed in the hole 42 of the workpiece support member 41. In the present embodiment, before the machine tool drives, the workpiece 31 is in a state of being not fixed to the workpiece support member 41.

The control apparatus 6 of the machine tool 5 changes a position of the spindle head 65 so that the rotation axis 85 of the spindle 1 coincides with a center axis of the workpiece 31. The control apparatus 6 disposes the rotation tool 3 so that the pressing portion 25 of the rotation tool 3 is disposed at the position above the end surface 32 of the workpiece 31. The air supply device 45 supplies the compressed air to the air room 16 so that the air room 16 is under a predetermined pressure. The compressed air allows the movement portion 23 to be pressed toward the workpiece 31 as indicated by the arrow 92.

Next, the control apparatus 6 of the machine tool 5 drives a spindle motor which rotates the spindle 1. The spindle 1, the tool holder 2, the cutter holding portion 14, and the movement portion 23 integrally rotate. The blade portion 13 rotates together with the cutter holder 12. Meanwhile, the shaft portion 24 and the pressing portion 25 rotate together with the movement portion 23.

Next, the control apparatus 6 makes the spindle 1 to move to a side toward the workpiece 31 as indicated by an arrow 91. With reference to FIG. 1, in the present embodiment, the slide member 64 moves downward, whereby the spindle 1 descends. With reference to FIG. 2, the rotation tool 3 descends toward the workpiece 31.

Figure 3:
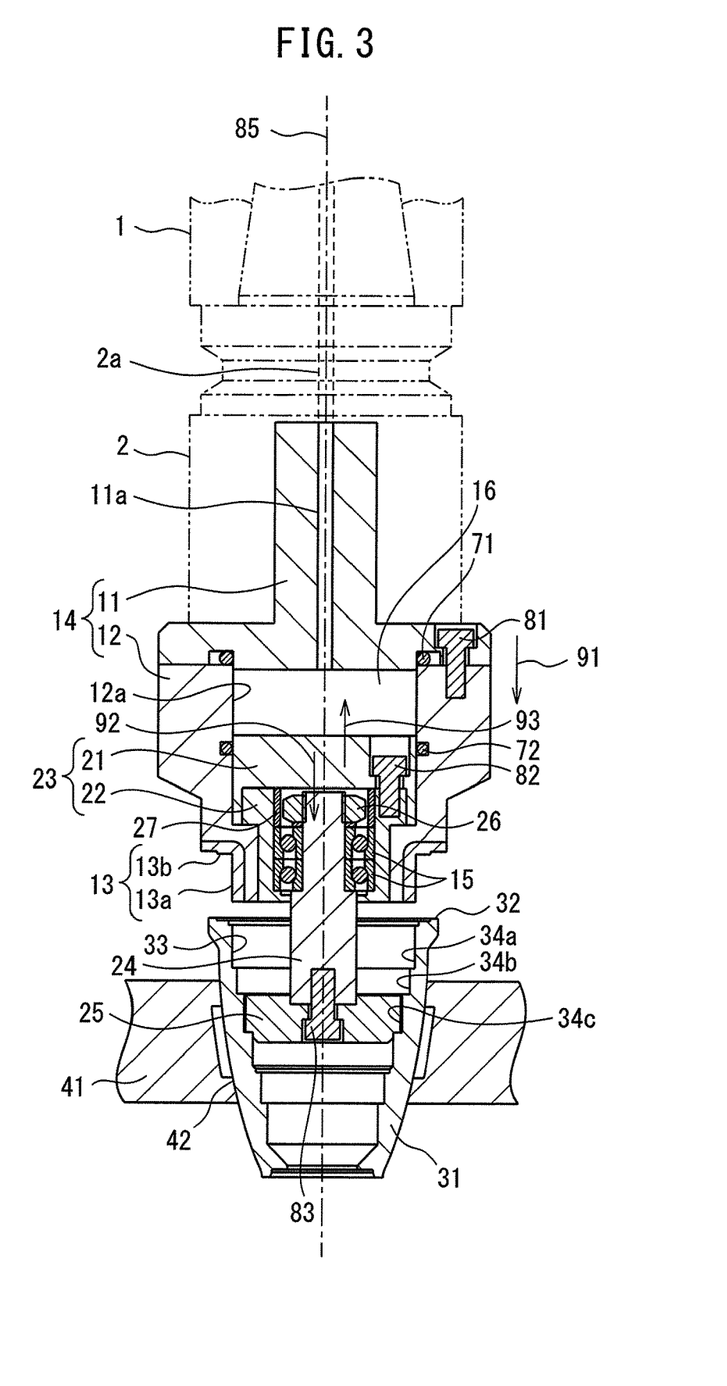
FIG. 3 is second enlarged cross-sectional view of the rotation tool and the workpiece according to the embodiment.

FIG. 3 shows second enlarged cross-sectional view of the rotation tool and the workpiece according to the present embodiment. The spindle 1 moves downward, whereby the pressing portion 25 of the rotation tool 3 comes into contact with a step portion of the third wall surface 34*c* of the workpiece 31. The pressing portion 25 and the shaft portion 24 of the rotation tool 3 stop rotating. On the other hand, the spindle 1, the tool holder 2, the cutter holding portion 14, and the movement portion 23 rotate due to an effect of the bearing 15. At this instant, the blade portion 13 is in a state of being separated from the workpiece 31.

Further, when the spindle 1 moves in the direction toward the workpiece 31 as indicated by the arrow 91, the pressing portion 25 presses the workpiece 31. The movement portion 23 relatively moves with respect to the cutter holder 12 as indicated by an arrow 93. The piston member 21 is pressed by the pressure of the compressed air so that the pressing portion 25 presses the workpiece 31 by a pressing force in accordance with the pressure of the compressed air.

When the piston member 21 relatively moves in the interior of the hole 12*a* of the cutter holder 12, a volume of the air room 16 reduces. The air supply device 45 according to the present embodiment is controlled by the control apparatus 6 of the machine tool 5. The air supply device 45 adjusts the pressure in the air room 16 based on the pressure of the air which is outputted by the pressure sensor 46. The air supply device 45 according to the present embodiment adjusts the pressure of the air in accordance with a change of the volume of the air room 16 during machining of the workpiece 31 so that the pressure in the air room 16 is a predetermined constant pressure.

The workpiece 31 is pressed against the workpiece support member 41 by a predetermined force. The workpiece 31 is pressed against the workpiece support member 41 so that the workpiece 31 can be fixed to the workpiece support member 41.

The spindle 1 moves in the direction indicated by the arrow 91 so that the inner surface cutting portion 13a of the blade portion 13 comes into contact with the wall surface 34a of the workpiece 31. By the inner surface cutting portion 13a, cutting process of the wall surface 34a can be performed. At this time, the workpiece 31 is fixed by the fixing device 7 so that stable cutting process can be performed. Note that when a thrust force in the axial direction of the spindle 1 is Fz, and a pressing force generated by the piston member 21 is Fp, a thrust force F which makes the cutter holding portion 14 to descend is represented by F=Fz−Fp.

Figure 4:
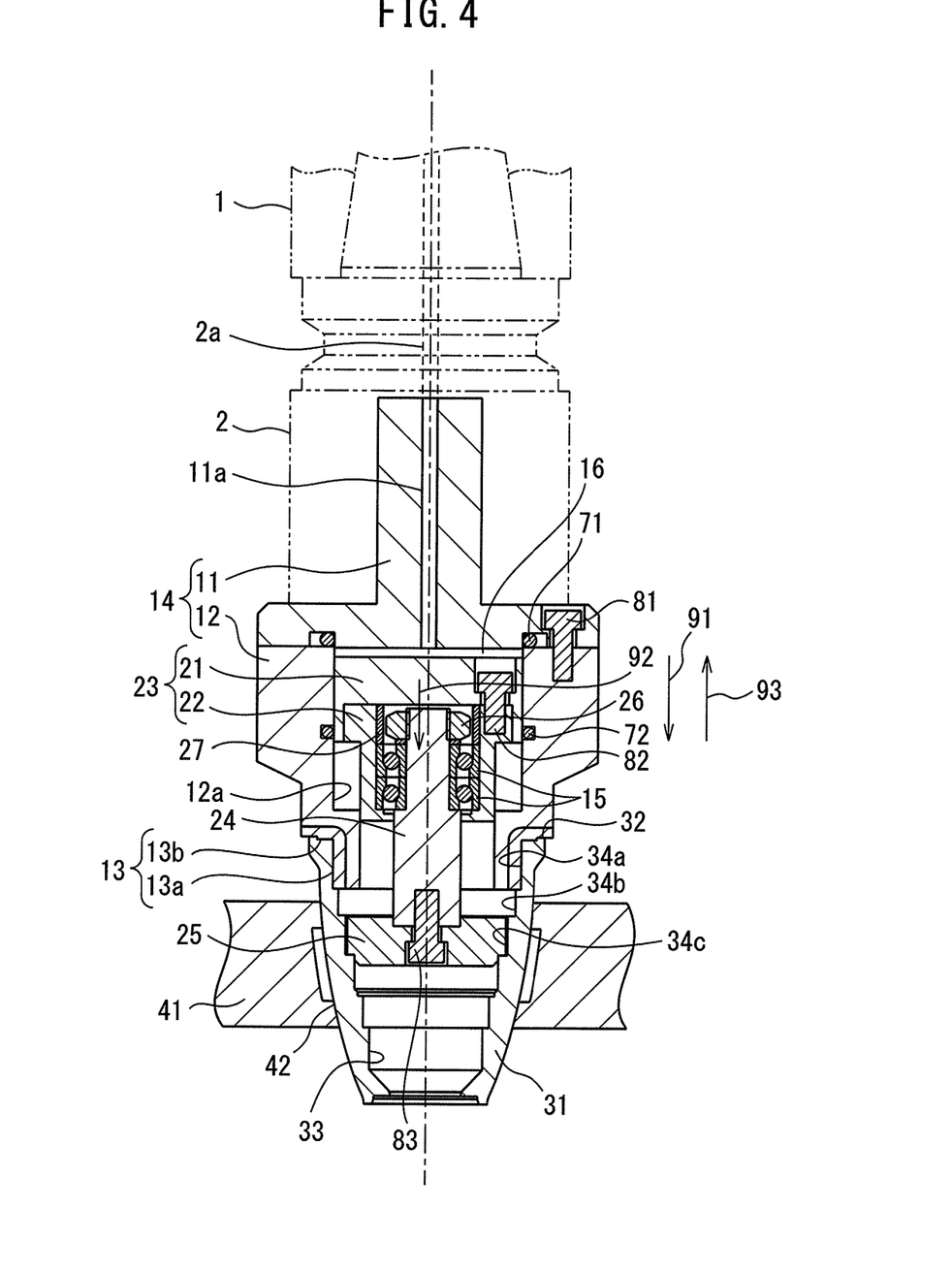
FIG. 4 is third enlarged cross-sectional view of the rotation tool and the workpiece according to the embodiment.

FIG. 4 shows third enlarged cross-sectional view of the rotation tool and the workpiece according to the present embodiment. When the inner surface cutting portion 13a proceeds while cutting the wall surface 34a of the workpiece 31, the end surface cutting portion 13b of the blade portion 13 comes into contact with the end surface 32 of the workpiece 31. The cutting process of the end surface 32 can be performed by the end surface cutting portion 13b. The movement of the spindle 1 is continued until the end surface cutting portion 13b proceeds to a predetermined position. When machining by the end surface cutting portion 13b is completed, the control apparatus 6 of the machine tool 5 stops movement of the spindle 1 as indicated by the arrow 91.

Next, the control apparatus 6 performs a control of withdrawing the rotation tool 3 from the workpiece 31. As indicated by the arrow 93, the control apparatus 6 makes the spindle 1 to move in a direction moving away from the workpiece 31. The spindle 1, the tool holder 2, and the cutter holding portion 14 move in a direction indicated by the arrow 93. The blade portion 13 separates from the workpiece 31. In the interior of the cutter holding portion 14, the movement portion 23 is pressed as indicated by the arrow 92 and thus fails to move, and a state in which the pressing portion 25 is in contact with the inner surface 33 of the workpiece 31 is maintained.

In the interior of the cutter holding portion 14, when the movement portion 23 reaches a movement limit position, the pressing portion 25 separates from the workpiece 31. In other words, after the air room 16 is restored to the original volume, the pressing portion 25 separates from the workpiece 31. Pressing the workpiece 31 is released. Thus, restoration is made to a state illustrated in FIG. 2 and cutting process is terminated.

The rotation tool 3 according to the present embodiment can perform cutting process while fixing the workpiece 31. At this time, while one fixed state is maintained without changing a fixed state of the workpiece 31, machining the inner surface 33 and machining the end surface 32 of the workpiece 31 can be successively performed. In other words, without changing a holding state of the workpiece 31, machining a plurality of parts of the workpiece 31 can be performed at one time. Accordingly, machining a plurality of parts of the workpiece 31 can be performed with high accuracy.

By the way, when the workpiece is fixed to a spindle of a lathe, a chuck device having three claw portions can be used. However, when the workpiece in which an outer diameter changes along a longitudinal direction such as the workpiece according to the present embodiment is used, it is difficult to fix the workpiece firmly by the chuck device having three claw portions. In this regard, in the lathe, a jig to be inserted into a hole of the workpiece can be mounted to the spindle of the lathe. Then, the workpiece is pressed against the jig by a pressing member from a side opposite to the spindle so that the workpiece can be fixed. In such a state, while the workpiece is rotated, an inner surface and an end surface of the workpiece can be machined by a cutting tool or the like. In lathe-turning process using such a lathe, a workpiece fixing method is not changed, whereby machining can be performed with high machining accuracy.

Also in the rotation tool according to the present embodiment, a workpiece fixing method is not changed when a plurality of parts are machined, whereby cutting process can be performed with high machining accuracy. Further, the fixing device for the rotation tool according to the present embodiment can stably fix even a workpiece difficult to fix from outside.

Figure 5:
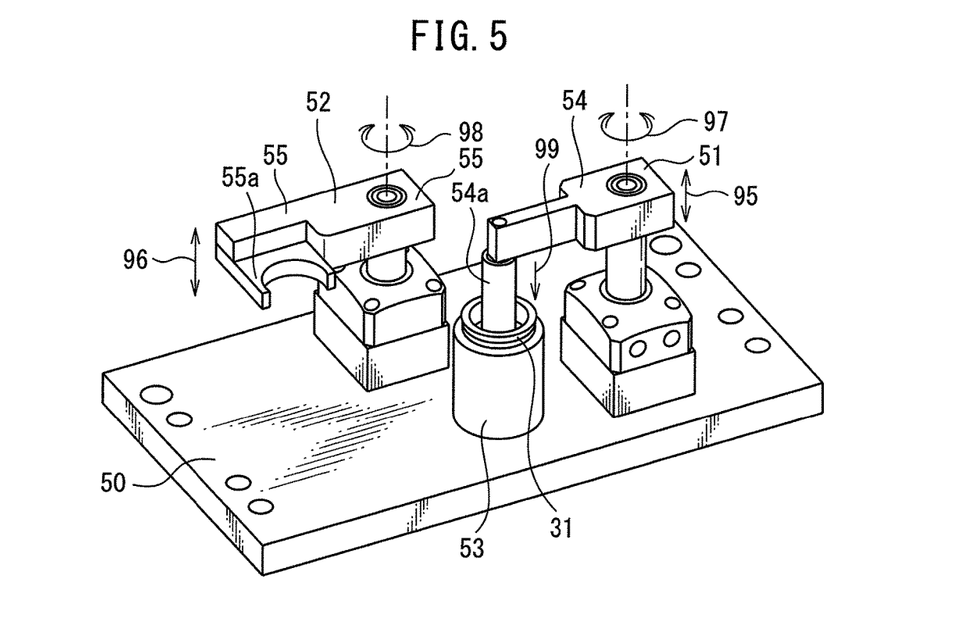
FIG. 5 is first perspective view of a fixing device which fixes the workpiece according to a comparative example.

FIG. 5 shows first perspective view of a workpiece fixing device according to a comparative example. The fixing device according to the comparative example comprises a base member 50, first clamp device 51, and second clamp device 52. The base member 50 is fixed, for example, to the table 61 of the machine tool 5. A workpiece support member 53 which supports the workpiece 31 is fixed to the base member 50. The workpiece 31 is disposed in the interior of the workpiece support member 53.

The first clamp device 51 includes a movement portion 54. At a tip end of the movement portion 54, a pressing portion 54a is formed. The pressing portion 54a is formed to have a bar shape in such a manner as to be capable of being inserted into the interior of the workpiece 31. The pressing portion 54a has a shape so as to press a bottom surface of the workpiece 31. The movement portion 54 is formed to be movable by the working fluid device in a direction indicated by an arrow 95. The movement portion 54 is formed to be movable in a direction along an axial line of the workpiece 31. Further, the movement portion 54 is formed to be rotatable as indicated by an arrow 97.

The second clamp device 52 is disposed separately from the first clamp device 51. The second clamp device 52 comprises a movement portion 55. A pressing portion 55a is formed at a tip end of the movement portion 55. The pressing portion 55a has a shape to be capable of pressing an upper portion of the workpiece 31. The movement portion 55 is formed to be movable by the working fluid device in a direction indicated by an arrow 96. Further, in the second clamp device 52, the movement portion 55 is formed to be rotatable as indicated by an arrow 98.

FIG. 5 illustrates a state in which the workpiece 31 is fixed by the first clamp device 51. The pressing portion 54a of the movement portion 54 is inserted in the interior of the workpiece 31. The pressing portion 54a presses the bottom surface of the workpiece 31 as indicated by an arrow 99 so that the workpiece 31 is fixed to the workpiece support member 53. In such a state, the machine tool can cut a part of the end surface of the workpiece 31. In other words, the machine tool can perform cutting process in such a range that a tool does not interfere with the movement portion 54, by moving at least one of the tool and the table.

Figure 6:
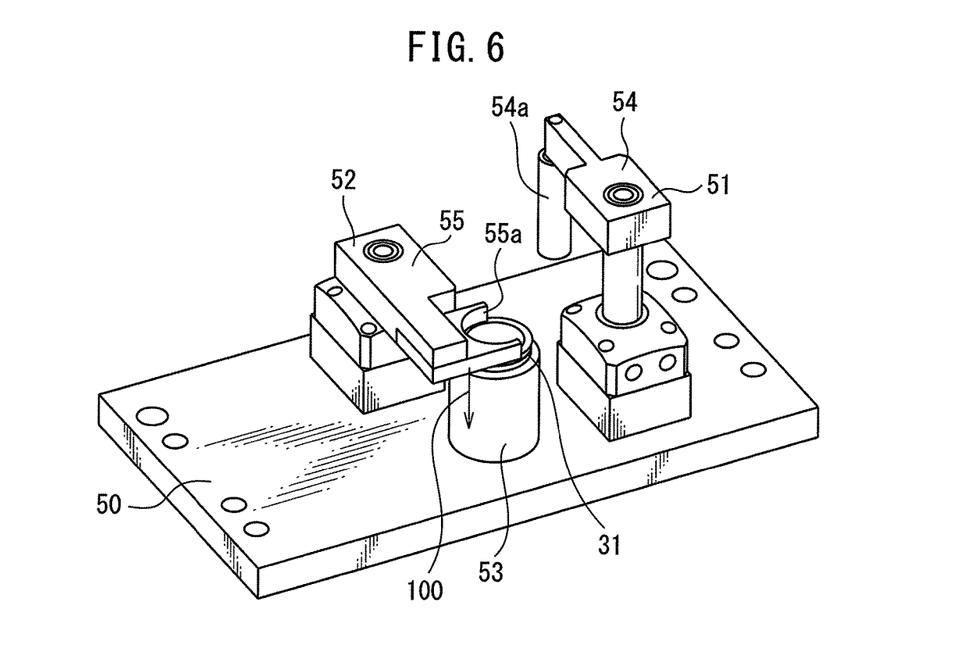
FIG. 6 is second perspective view of the fixing device which fixes the workpiece according to the comparative example.

FIG. 6 shows second perspective view of the workpiece fixing device according to the comparative example. FIG. 6 illustrates a state in which the workpiece 31 is fixed by the second clamp device 52. As indicated by an arrow 100, the pressing portion 55a of the movement portion 55 presses an end portion of the workpiece 31 so that the workpiece 31 is fixed to the workpiece support member 53. The tool can be inserted in the interior of the workpiece 31 by using the second clamp device 52. Thus, the machine tool can perform cutting process of the inner surface of the workpiece 31 by moving at least one of the tool and the table.

As the workpiece fixing device according to the comparative example, by switching the clamp devices 51 and 52, machining the inner surface of the workpiece 31 and machining the end surface can be performed. However, when the clamp devices 51 and 52 are switched, a position and a posture of the workpiece 31 may be slightly changed. As a result, machining accuracy when the workpiece 31 is machined may deteriorate. For example, a position of the center axis of the workpiece 31 when fixing is made by the first clamp device 51 and the position of the center axis of the workpiece 31 when fixing is made by the second clamp device 52 may be different. As a result, machining accuracy deteriorates and obtaining such machining accuracy as lathe-turning process may be difficult.

In contrast to the fixing device according to the comparative example, the rotation tool according to the present embodiment can perform machining of the inner surface of the workpiece and machining of the end surface without switching devices which fix the workpiece. Thus, machining can be performed with high machining accuracy as lathe-turning process. For example, in the present embodiment, when the inner surface of the workpiece is machined and when the end surface of the workpiece is machined, the center axis of the workpiece is maintained at a certain position. Accordingly, machining can be performed with high accuracy without producing a step and the like on the surface to be machined of the workpiece.

The air supply device 45 according to the present embodiment controls a pressure of the compressed air in such a manner as to press the movement portion 23 at a predetermined constant pressure during machining of the workpiece. In other words, the air supply device 45 performs a control so that a pressure in the air room 16 is constant. By adopting this configuration, the workpiece 31 can be fixed by a constant force during a period in which cutting process is performed. When a force which fixes the workpiece 31 changes, distortion which occurs in the workpiece 31 may change. When distortion of the workpiece 31 changes during machining of the workpiece 31, uneven machining occurs. As a result, machining accuracy may be deteriorated. In the present embodiment, the workpiece 31 is fixed by a constant force, whereby deterioration of machining accuracy can be suppressed.

Further, in the present embodiment, the compressed air is supplied to the air room 16 through the tool holder 2. By adopting this configuration, the movement portion 23 is pressed using a simple structure, while a force which presses the movement portion 23 can be controlled.

Further, the working fluid supply device according to the present embodiment is formed in such a manner as to be capable of adjusting a pressure of the working fluid when the workpiece is machined in accordance with a machining method or a type of the workpiece. The air supply device 45 is formed to be capable of adjusting a pressure of the compressed air. The pressure of the air in accordance with a machining method and a type of the workpiece 31 can be determined in advance. Further, the storage part of the control apparatus 6 can store the pressure of the air.

For example, when heavy cutting process is performed, firmly fixing the workpiece 31 so that the workpiece 31 does not move is favorable. In such a case, the air supply device 45 can increase the pressure of the air. On the other hand, when the workpiece 31 is fixed by a large pressing force, distortion may occur in the workpiece 31. Thus, when light cutting process is performed, reducing a force which fixes the workpiece is favorable. In such a case, the air supply device 45 can reduce the pressure of the air. The force which fixes the workpiece 31 is reduced so that distortion of the workpiece 31 can be suppressed and machining accuracy can be improved.

Further, when a material of the workpiece 31 is hard, firmly fixing the workpiece 31 is favorable. On the other hand, when the material of the workpiece 31 is soft, fixing the workpiece 31 by a large force may cause the workpiece 31 to be distorted. In such a case, fixing the workpiece 31 by a small force is favorable.

Thus, the air supply device 45 can easily change a force which fixes the workpiece by adjusting the pressure of the compressed air. The air supply device 45 according to the present embodiment can adjust the pressure of the air in accordance with a machining method or a type of the workpiece 31 so that improving machining accuracy can be aimed.

In the present embodiment, compressed air is used as the working fluid which controls a force pressing the movement portion, but also in a case in which a hydraulic oil is used, a control similar to that of the present embodiment can be performed. In other words, a hydraulic oil supply device serving as the working fluid supply device can control a pressure of the hydraulic oil in such a manner as to press the movement portion at a predetermined constant pressure. Further, the hydraulic oil supply device can adjust the pressure of the hydraulic oil in accordance with a machining method or a type of the workpiece.

Figure 7:
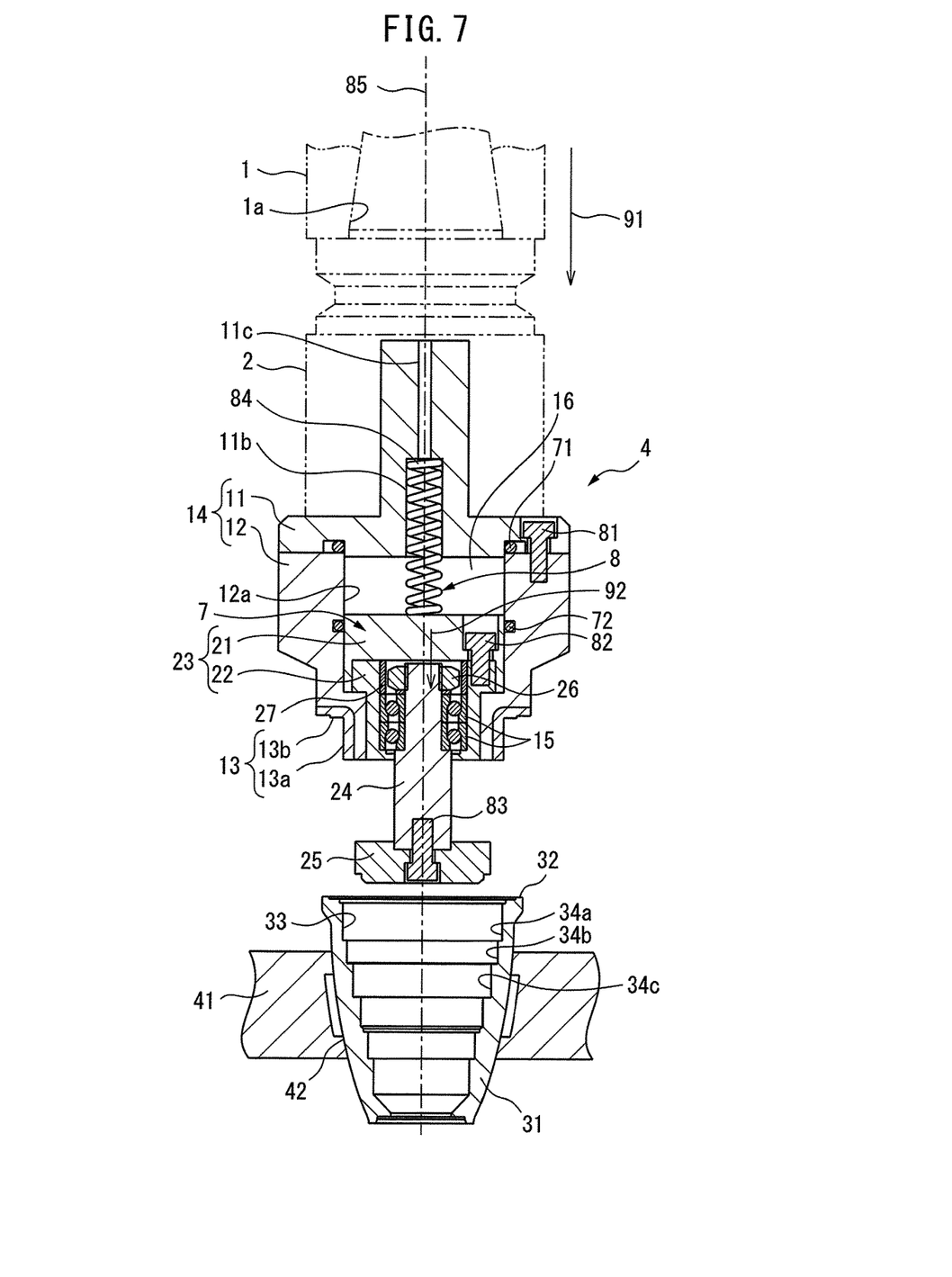
FIG. 7 is an enlarged cross-sectional view of another rotation tool according to the embodiment.

FIG. 7 shows an enlarged cross-sectional view of another rotation tool according to the present embodiment. Another rotation tool 4 differs from the rotation tool 3 as described above in a configuration of the pressing device 8 which presses the movement portion 23. In another rotation tool 4, the pressing device 8 includes a coil spring 84 serving as a spring member. The coil spring 84 is disposed between the movement portion 23 and the cutter holding portion 14. A recessed portion 11b is formed in the holder shank 11. The coil spring 84 is disposed in the recessed portion 11b. In the holder shank 11, a hole 11c which serves as a flow passage of the air is formed so that the outside air flows into the air room 16 and the air flows out of the air room 16. The movement portion 23 is pressed by the coil spring 84. By employing a mechanism in which the movement portion 23 is pressed by the spring member, the pressing device can be easily formed. Thus, as the pressing device which presses the movement portion, which is not limited to a mechanism which presses by a working fluid, an arbitrary mechanism can be employed.

The blade portion fixed to the cutter holding portion according to the present embodiment includes the inner surface cutting portion and the end surface cutting portion. The blade portion according to the present embodiment is formed in such a manner as to machine the inner surface and the end surface of the workpiece, but is not limited to such a configuration, and an arbitrary blade portion which machines the workpiece can be formed. For example, the blade portion may fail to include the end surface cutting portion but may include the inner surface cutting portion. Alternatively, the blade portion may include a cutting portion which cuts an outer circumferential surface of the workpiece.

The machine tool according to the present embodiment has three drive axes but is not limited to such a configuration, and the present invention can be applied to an arbitrary machine tool in which the rotation tool is formed to be movable along the rotation axis of the spindle.

According to the present invention, a rotation tool which fixes a workpiece having such a shape as is difficult to fix from outside and cuts the workpiece with high machining accuracy can be provided.

The embodiments as described above can be suitably combined. In each drawing as described above, the same reference numerals are assigned to the same or corresponding parts. Note that the above embodiments are illustrative and not to limit the invention. Moreover, in the embodiments, modifications to the embodiments recited in the claims are included.

The invention claimed is:

1. A machine tool for machining a workpiece having a cross-sectional shape in which an outer shape becomes gradually smaller along an axial direction, the machine tool comprising: a rotation tool mounted to a spindle through a tool holder; and a workpiece support member fixed to a table; wherein the rotation tool includes a cutter holding portion which is fixed to the tool holder and to which blade portion is fixed; a fixing device which fixes the workpiece to the workpiece support member by pressing the workpiece, the workpiece support member includes a hole that is formed so as to match the outer shape of the workpiece and in which the workpiece is disposed, the blade portion is disposed at a tip end of the cutter holding portion on a side toward the workpiece, the fixing device includes a movement portion formed to be movable translationally along an axis parallel with the spindle in the interior of the cutter holding portion, a pressing device which presses the movement portion to a side toward the workpiece, a shaft portion rotatably supported relative to the movement portion and disposed coaxially with the spindle, and a pressing portion which is disposed at a tip end of the shaft portion and presses an inner surface of the workpiece, the pressing portion is formed in a plate shape so as to correspond to a shape of a portion of the workpiece with which the pressing portion comes into contact, and the workpiece is fixed to the workpiece support member solely by the pressing portion of the fixing device and when the pressing portion presses the workpiece toward the workpiece supporting member so that the fixing device fixes the workpiece to the workpiece supporting member.

2. The machine tool according to claim 1, wherein the blade portion includes an inner surface cutting portion which cuts an inner surface of the workpiece and an end surface cutting portion which cuts an end surface of the workpiece.

3. The machine tool according to claim 1, wherein
the pressing device includes a working fluid supply device which supplies a working fluid,
the working fluid includes a compressed air or a hydraulic oil supplied through the tool holder,
the movement portion is pressed by a pressure of the working fluid, and
the working fluid supply device controls the pressure of the working fluid in such a manner as to press the movement portion at a predetermined constant pressure during machining of the workpiece.

4. The machine tool according to claim 1, wherein
the pressing device includes the working fluid supply device which supplies the working fluid, the working fluid includes the compressed air or the hydraulic oil supplied through the tool holder,
the movement portion is pressed by a pressure of the working fluid, and the working fluid supply device is formed in such a manner as to be capable of adjusting the pressure of the working fluid in accordance with a machining method or a type of the workpiece.

5. The machine tool according to claim 1, wherein
the pressing device includes a spring member disposed between the movement portion and the cutter holding portion, and
the movement portion is pressed by the spring member.

* * * * *